US012657900B2

(12) United States Patent
Ekman Von Huth et al.

(10) Patent No.: US 12,657,900 B2
(45) Date of Patent: Jun. 16, 2026

(54) MULTI-TASK TRANSFER LEARNING USING WEIGHT DIVERGENCE CONSTRAINTS

(71) Applicant: QUALCOMM Incorporated, San Diego, CA (US)

(72) Inventors: Simon Ekman Von Huth, Nacka (SE); Mohammadreza Malek-Mohammadi, Solna (SE); Saeed Dabbaghchian, Bromma (SE)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/467,017

(22) Filed: Sep. 14, 2023

(65) Prior Publication Data

US 2024/0412499 A1    Dec. 12, 2024

Related U.S. Application Data

(60) Provisional application No. 63/507,542, filed on Jun. 12, 2023.

(51) Int. Cl.
G06V 10/82          (2022.01)
(52) U.S. Cl.
CPC .................................... G06V 10/82 (2022.01)
(58) Field of Classification Search
CPC ...................................................... G06V 10/82
See application file for complete search history.

(56) References Cited

U.S. PATENT DOCUMENTS

| | | | | |
|---|---|---|---|---|
| 11,798,180 B2 * | 10/2023 | Yin | ............................ | G06T 7/13 |
| 12,217,361 B1 * | 2/2025 | Chunduru | ............... | G06T 17/00 |
| 2021/0390270 A1 * | 12/2021 | Fei | ......................... | G06F 40/197 |
| 2023/0368147 A1 * | 11/2023 | Adeli-Nadjafi | ........ | G06N 20/00 |
| 2024/0144019 A1 * | 5/2024 | Weinzaepfel | .......... | G06N 3/084 |
| 2024/0296208 A1 * | 9/2024 | Abbassi | ............. | G06Q 20/3674 |
| 2025/0006346 A1 * | 1/2025 | Kanakatte Gurumurthy | ............... | |
| | | | | G06V 10/82 |
| 2025/0117929 A1 * | 4/2025 | Barve | .................... | G06T 7/0012 |
| 2025/0131281 A1 * | 4/2025 | Lord | ........................ | G06N 3/09 |

FOREIGN PATENT DOCUMENTS

EP          4354353 A1      4/2024

OTHER PUBLICATIONS

Bengio Y., et al., "Curriculum Learning", International Conference on Machine Learning, Jun. 14, 2009, Association for Computing Machinery, pp. 41-48.

(Continued)

*Primary Examiner* — Qun Shen
(74) *Attorney, Agent, or Firm* — Patterson & Sheridan LLP

(57)          ABSTRACT
Certain aspects of the present disclosure provide techniques and apparatus for training a machine learning model based on transfer learning and weight divergence constraints. The method generally includes receiving weight information associated with a machine learning model, wherein the machine learning model comprises a model trained to perform a first task; updating the machine learning model to perform a second task based on the received weight information and a weight divergence constraint between weights defined for the first task and weights updated for the second task; and deploying the updated machine learning model.

21 Claims, 4 Drawing Sheets

(56) References Cited

OTHER PUBLICATIONS

Li X., et al., "Explicit Inductive Bias for Transfer Learning with Convolutional Networks", Proceedings of the 35th International Conference on Machine Learning, Jul. 2018, ISSN: 2640-3498, 10 Pages.

Parisi G.I., "Continual Lifelong Learning with Neural Networks: A Review", arXiv:1802.07569v4 [cs.LG], Feb. 11, 2019, Neural Networks (2019), pp. 1-29.

Yosinski J., et al., "How Transferable are Features in Deep Neural Networks?", Advances in Neural Information Processing Systems, vol. 27, Nov. 6, 2014, pp. 1-9, XP055277610.

Zamir A.R., et al., "Taskonomy: Disentangling Task Transfer Learning," Proceedings of the IEEE Conference on Computer Vision and Pattern Recognition (CVPR), Apr. 23, 2018, 12 Pages, ArXiv:1804. 08328v1 [cs.CV], pp. 13 and 33.

Zilly J., et al., "On Plasticity, Invariance, and Mutually Frozen Weights in Sequential Task Learning", Advances in Neural Information Processing Systems, vol. 34, Dec. 2021, pp. 1-14.

Crawshaw M., "Multi-Task Learning with Deep Neural Networks: A Survey", arXiv.org, Sep. 10, 2020, XP093115219, 43 Pages, Ithaca, The Whole Document.

International Search Report and Written Opinion - PCT/US2024/ 027084—ISA/EPO—Aug. 27, 2024.

Kumar V.R., "Surround-View Cameras Based Holistic Visual Perception for Automated Driving", arxiv.org, Cornell University Library, 201 Olin Library Cornell University Ithaca, NY 14853, Jun. 11, 2022, 245 Pages, XP091245277, The Whole Document.

Li X., et al., "Explicit Inductive Bias for Transfer Learning with Convolutional Networks", arxiv.org, Cornell University Library, 201 Olin Library Cornell University Ithaca, NY 14853, Feb. 5, 2018, XP081215039, Jun. 6, 2018, 12 Pages, Appendix A and C, p. 1-p. 7, Figures 1-4, Tables 1-5.

* cited by examiner

100

110

| Weights 112A |
| Weights 112B |
| ⋮ |
| Weights 112Z |

120

| Modified Weights 122A |
| Modified Weights 122B |
| ⋮ |
| New Weights 124 |

SOURCE TASK

DOWNSTREAM TASK

200

Source Task

202

206

210 220 222

Encoder Decoder Task Head

208

Transfer

Downstream Task

204

206

210

Encoder Decoder Task Head

209

240

242

Freeze Soft Sharing

230

Encoder

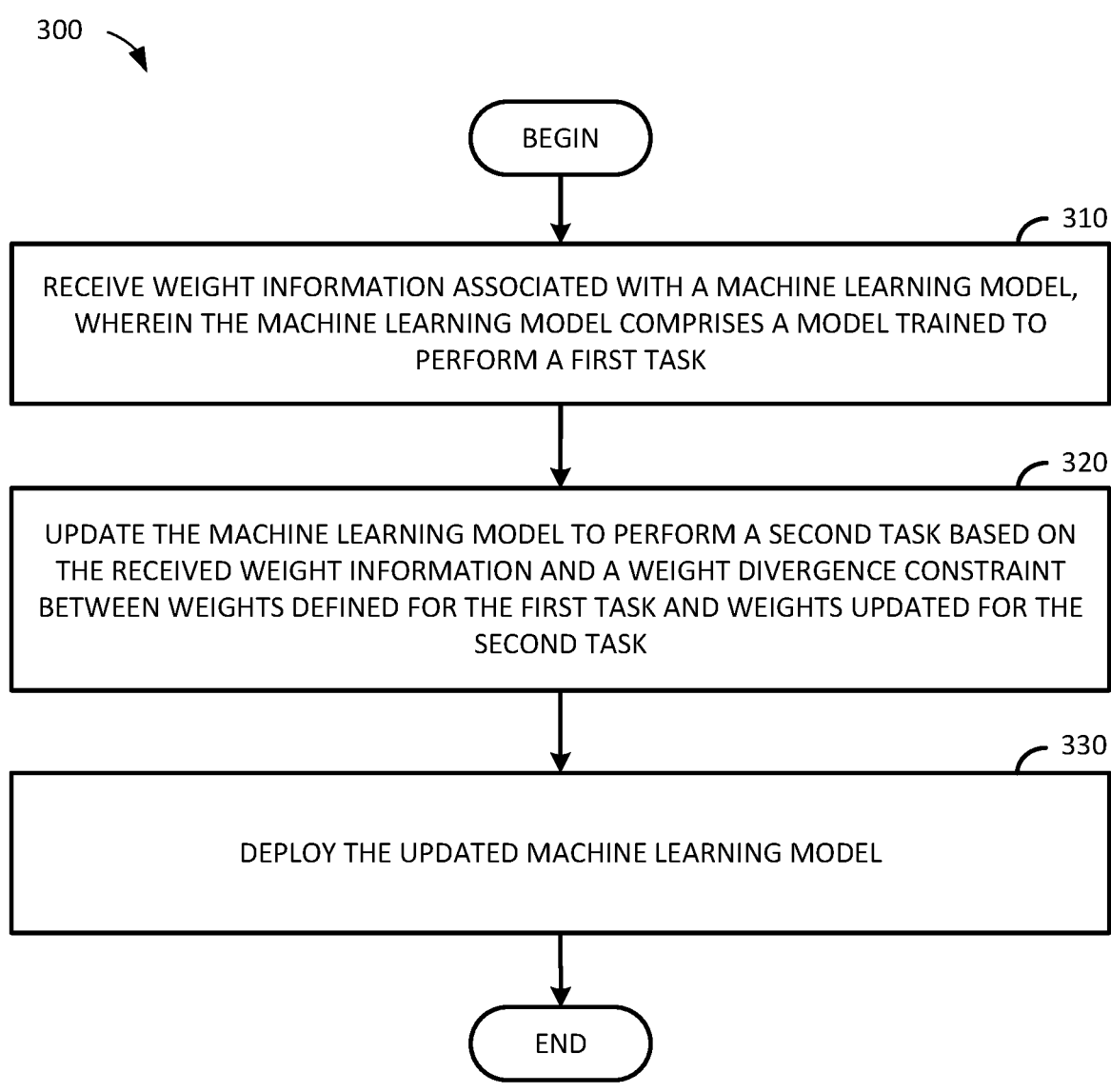

300

BEGIN

RECEIVE WEIGHT INFORMATION ASSOCIATED WITH A MACHINE LEARNING MODEL, WHEREIN THE MACHINE LEARNING MODEL COMPRISES A MODEL TRAINED TO PERFORM A FIRST TASK

310

UPDATE THE MACHINE LEARNING MODEL TO PERFORM A SECOND TASK BASED ON THE RECEIVED WEIGHT INFORMATION AND A WEIGHT DIVERGENCE CONSTRAINT BETWEEN WEIGHTS DEFINED FOR THE FIRST TASK AND WEIGHTS UPDATED FOR THE SECOND TASK

320

DEPLOY THE UPDATED MACHINE LEARNING MODEL

330

END

402 — CPU

412 — WIRELESS CONNECTIVITY

404 — GPU

408 — NPU

406 — DSP

422 — INPUT/OUTPUT

424 — MEMORY

424A — WEIGHT INFORMATION RECEIVING COMPONENT

424C — MACHINE LEARNING MODEL DEPLOYING COMPONENT

424B — MACHINE LEARNING MODEL UPDATING COMPONENT

MULTI-TASK TRANSFER LEARNING USING WEIGHT DIVERGENCE CONSTRAINTS

CROSS-REFERENCE TO RELATED APPLICATIONS

This application claims priority to and benefit of U.S. Provisional Patent Application Ser. No. 63/507,542, entitled "Multi-Task Transfer Learning Using Weight Divergence Constraints," filed Jun. 12, 2023, and assigned to the assignee hereof, the entire contents of which are incorporated by reference.

INTRODUCTION

Aspects of the present disclosure relate to transfer learning.

Machine learning models can be used to perform various tasks, such as tasks based on computer vision, natural language processing, audio processing, and the like. Single-purpose models may be trained to perform a specific task. For example, in an autonomous driving scenario, different models may be trained to perform semantic segmentation (e.g., to divide visual content into different regions corresponding to different types of objects), object detection, motion prediction, and the like. In another example, generative artificial intelligence models may be trained to generate responses to queries from different data domains. In such a case, one model may be trained to generate responses based on a general knowledge database, and other models may be trained to generate responses based on domain-specific knowledge databases.

Training and maintaining multiple machine learning models to perform related tasks may be computationally expensive. Thus, to reduce the computational expense of maintaining multiple models, transfer learning techniques can be used to generate a model that can perform multiple related tasks. In transfer learning, machine learning models pretrained on large-scale datasets can leverage the knowledge obtained from one dataset to perform a different but related task (e.g., transferring classification-related knowledge for classifying one type of object to classifying a different type of object in image data). To perform transform learning, portions of the machine learning model can be finetuned in order to adjust a pre-trained model for a downstream task different from the original, or source, task for which the model was trained. Finetuning the machine learning model generally produces a separate copy of the pre-trained model parameters for each task. Although generating different versions of the pre-trained model parameters for different tasks may be a useful approach, efficiency may decrease as the number of downstream tasks for which a model is trained increases. Such finetuning may be computationally expensive, leading such models to be impractical or infeasible to deploy on memory-constrained systems (e.g., edge devices, such as mobile phones or other computing devices with limited computational and/or memory capabilities). Finetuning the last classification layer in a machine learning model may be less computationally expensive, but may result in lower inference performance on downstream tasks, than finetuning more than the last classification layer in the machine learning model.

BRIEF SUMMARY

Certain aspects generally relate to transfer learning using weight divergence constraints in a machine learning model.

Certain aspects provide a processor-implemented method for training a machine learning model based on transfer learning and weight divergence constraints. The method generally includes receiving weight information associated with a machine learning model, wherein the machine learning model comprises a model trained to perform a first task; updating the machine learning model to perform a second task based on the received weight information and a weight divergence constraint between weights defined for the first task and weights updated for the second task; and deploying the updated machine learning model.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and apparatus comprising means for performing the aforementioned methods as well as those further described herein.

The following description and the related drawings set forth in detail certain illustrative features of one or more aspects.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 3 illustrates example operations for training a machine learning model to perform a downstream task using transfer learning and weight divergence constraints, in accordance with aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
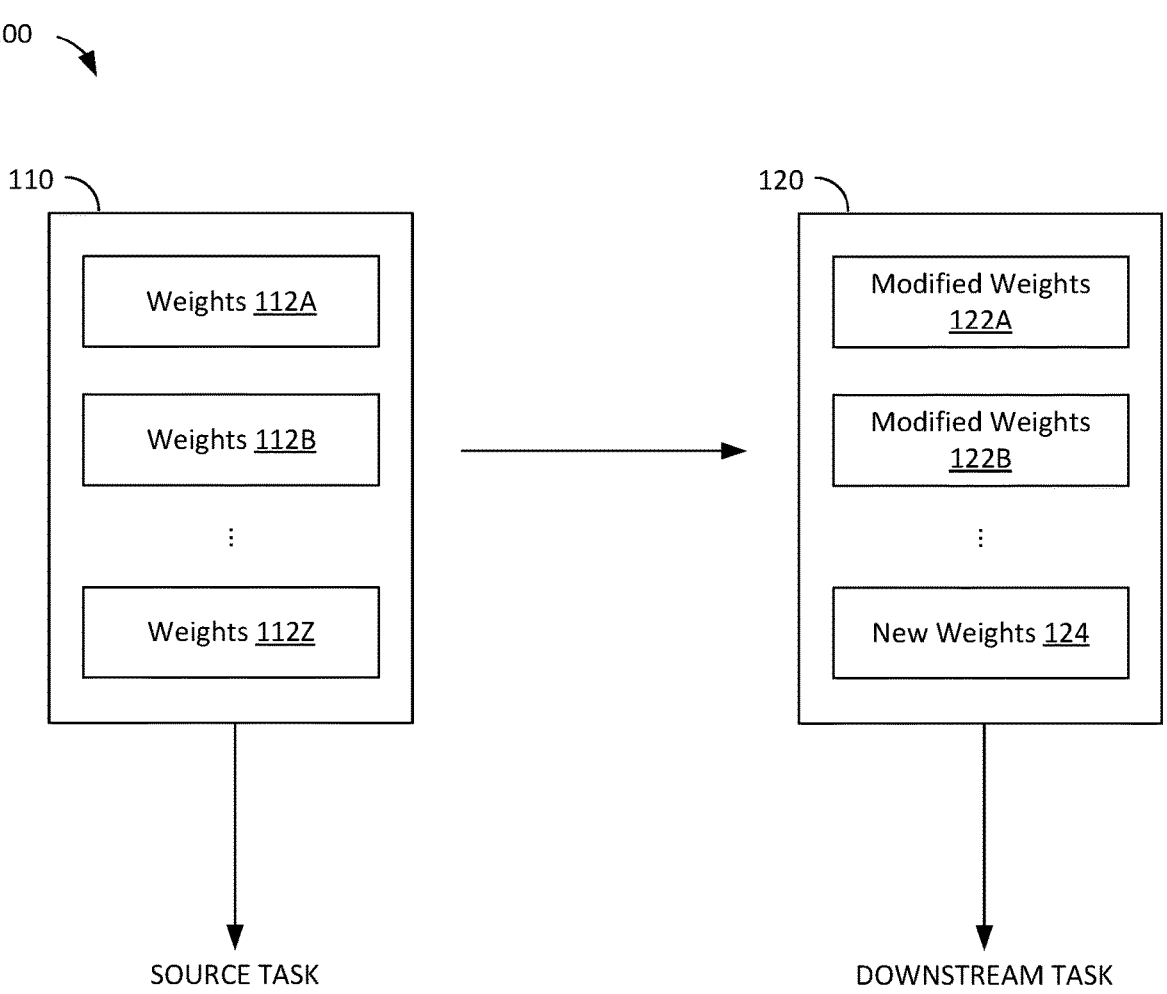
FIG. 1 depicts an example pipeline for training a machine learning model to perform a downstream task using transfer learning and weight divergence constraints, in accordance with aspects of the present disclosure.

Aspects of the present disclosure provide apparatuses, methods, processing systems, and computer-readable mediums for training machine learning models using transfer learning and weight divergence constraints.

Transfer learning may be useful in various fields, such as computer vision, natural language processing, and audio processing and/or analysis, with machine learning models pre-trained on large-scale datasets to leverage the knowledge gained while training a machine learning model to perform an initial task. Finetuning the layers of the machine learning model or the last classification layer is used in some cases, in order to transfer a pre-trained machine learning model to a downstream task (e.g., adapt the pre-trained machine learning model to perform a task different from the original task for which the machine learning model was initially trained). As discussed, finetuning the layers produces a separate copy of the pre-trained model parameters for each task, while finetuning the last classification layer may reduce the computational expense of transfer learning at the expense of inference performance on downstream tasks (e.g., tasks other than the original task for which the machine learning model was trained).

In some aspects, transfer learning may be performed by initially training a machine learning model to perform a first task, then training the machine learning model to perform a second task by freezing (or otherwise holding constant) some portions of the machine learning model and allowing other portions of the machine learning model to adapt to the new task. For example, in an encoder-decoder model architecture, the trained weights of the encoder may be frozen (e.g., fixed, defined as constants, etc.), and weights for a decoder may be learned in order to adapt a machine learning model to perform a downstream task that is different from the task(s) for which the machine learning model was originally trained. By freezing the trained weights of the encoder and allowing for a new task-specific decoder to be trained, transfer learning techniques can allow for a model to be trained to perform new tasks while minimizing, or at least reducing, the impact of learning these new tasks on the model's ability to perform the task(s) for which the model was originally trained.

However, training a machine learning model using transfer learning techniques and frozen weights for at least a portion of the model imposes various complexities and inefficiencies on a machine learning model. For example, by freezing an encoder portion of a machine learning model and training the model to perform a downstream task using transfer learning techniques, the encoding representations generated by the encoder portion of the machine learning model may include information that is used to perform the tasks for which the machine learning model was originally trained, as well as information that may be used to perform other tasks using the machine learning model. Further, in such a scenario, the objectives of different tasks for which the machine learning model was trained may conflict due to differing learning rates, gradient interference, or the like. As a result, models trained using transfer learning techniques and frozen weights at portions of the machine learning model may not accurately learn to perform other tasks, or more generally, may learn to perform various tasks with highly variable inference performance.

Aspects of the present disclosure provide techniques for using transfer learning techniques and weight divergence constraints to train a machine learning model to perform a downstream task different from the task(s) for which the model was originally trained. By training a machine learning model using transfer learning techniques and weight divergence constraints that allow for the weights and other parameters of various portions of the machine learning model to adapt to different tasks to be performed using the machine learning model, aspects of the present disclosure may leverage the computational efficiencies of training a single model to perform multiple tasks while improving inference performance for machine learning models trained using transfer learning techniques. Asymmetries between different tasks for which a machine learning model is trained may be reduced, which may allow for a machine learning model to learn representations that can accurately transfer knowledge between different tasks and improve the accuracy of inferences generated using the machine learning model.

Example Transfer Learning Using Weight Divergence Constraints

FIG. 1 depicts an example pipeline 100 for training a machine learning model to perform a downstream task using transfer learning and weight divergence constraints, in accordance with aspects of the present disclosure.

In the pipeline 100, a model 110 may be trained to perform a source task, and an updated model 120 may be trained using transfer learning techniques to perform a downstream task that is different from the source task. For example, in a video processing example, the model 110 may be trained to perform a task such as semantic segmentation of visual content (e.g., segmentation of visual content into different categories of objects), while the updated model 120 may be trained to perform object detection based on an input of visual content, or vice versa. It should be recognized that this is but one example of tasks for which a machine learning model can be trained using transfer learning, and other pairings of source and downstream tasks on other types of data may be contemplated.

Generally, the model 110 may include a plurality of layers, with each layer being associated with one of weights 112A-112Z. These weights may be generated when the model 110 is initially trained by minimizing, or at least reducing, a task-specific loss defined for the source task. The loss function used to measure the task-specific loss may be selected based on the source task for which the model 110 is initially trained. The task-specific loss may be calculated, for example, based on a cross-entropy loss function, a logarithmic loss function, an exponential loss function, a divergence loss function (e.g., a Kullback-Leibler (KL) loss function), or other appropriate loss function that can be used to train the model 110 to accurately perform a source task.

To generate the updated model 120, transfer learning techniques discussed herein may be used to adapt the model 110 to the updated model 120 such that the updated model 120 is trained to perform both the source task and a downstream task different from the source task. To generate the updated model 120, aspects of the present disclosure allow for weights associated with portions of a machine learning model to be modified according to a weight divergence constraint that limits the degree to which the weights can be modified. In some aspects, the portions of the machine learning model that can be modified in the pipeline 100 may be the portions of the machine learning model that would be frozen in conventional transfer learning techniques.

In some aspects, to generate the updated model 120, the updated model 120 may be trained to minimize, or at least reduce, the sum of a task-specific loss and a similarity loss that measures the similarity between weights (or other parameters) generated for the model 110 and updated weights generated for the updated model 120 when the updated model 120 is trained to perform a downstream task different from the source task. The similarity loss may be a used as a regularization term that modifies the task-specific loss function for the updated model 120 and measures the divergence between weights for the model 110, which are generated by training the model 110 to perform a source task, and weights for the updated model 120, which are generated by training the updated model 120 to perform the downstream task. The similarity loss ($\mathcal{L}$ sim) may be represented by the equation:

$$\mathcal{L}_{sim}(u, v) = \frac{\sum_{i}^{L} \|u_i - v_i\|_2}{\sum_{i}^{L} \|v_i\|_2}$$

where v represents the weights associated with the model 110 (e.g., the weights 112A-112Z), u represents the weights associated with the updated model 120 (e.g., the weights 122 illustrated in FIG. 1), and Z represents the number of layers in the model 110 and the updated model 120. Generally, the term $$\sum_{i}^{L} \|v_i\|_2$$

may act as a normalization value that results in $\mathcal{L}_{sim}$ representing a relative change in weights relative to the weights v associated with the model 110, such that $\mathcal{L}_{sim}$ is a normalized loss.

By adding this similarity loss to a task-specific loss and minimizing, or at least reducing, the sum of the similarity loss and task-specific loss, the similarity loss can be used as a weight divergence constraint that restricts the amount by which the weights for the updated model 120 diverge from the weights for the model 110. The use of a weight divergence constraint to restrict the amount which the weights for the updated model 120 diverge from the weights for the model 110 generally allows for the model to adapt to new tasks while preventing the model from generating representations of data different from that associated with the source task that significantly diverge from representations of data associated with the source task. Thus, the updated model 120 may be trained to generate representations of inputs that significantly reflect what was learned when the model 110 was trained to perform the source task.

The resulting updated model 120 may be defined, thus, in terms of weights for the L layers of the model, with some layers having weights that are modified from the weights for the corresponding layer in the model 110 (e.g., modified weights 122A and 122B corresponding to the layers for which the weights 112A and 112B apply in the model 110) and other layers being newly trained and having weights 124 that may have no relationship to the weights for the corresponding layers in the model 110. For example, the modified weights 122 (including weights 122A and 122B) may be weights for layers of the machine learning model that perform operations that may be common across the model 110 and the updated model 120, and the weights 124 may be weights associated with layers of the updated model 120 that perform task-specific functions.

Figure 2:
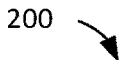
FIG. 2 illustrates an example of training an encoder-decoder model to perform a downstream task using transfer learning and weight divergence constraints, in accordance with aspects of the present disclosure.

FIG. 2 illustrates an example pipeline 200 for training an encoder-decoder model to perform a downstream task using transfer learning and weight divergence constraints, in accordance with aspects of the present disclosure.

In the pipeline 200, a model 202 trained to perform a source task (e.g., as illustrated, semantic segmentation of an input image to generate a segmentation map) may include an encoder 210, a decoder 220, and a task head 222. To perform the source task, the encoder 210 may be trained to encode an input 206 into a representation in a latent space. The decoder 220 decodes the encoding of the input 206 generated by the encoder 210 and passes the decoded latent space representation of the input 206 to a task head 222. The task head 222 uses the decoded latent space representation of the input 206 to generate an output 208. For example, the decoder 220 and task head 222 may be trained to perform predictions or otherwise generate inferences based on the latent space representation of the input. For the model 202, which as illustrated is trained to perform semantic segmentation of a visual input, the predictions generated by the decoder 220 and the task head 222 may include a segmentation map including predictions of different regions of the visual input corresponding to different classes of data. These predictions may include, for example, predictions of regions of the visual input corresponding to foreground content and background content, predictions of regions of the visual input corresponding to different classes or types of objects, or the like. For a model trained to perform object detection within an environment represented by a visual input, the predictions generated by the decoder 220 and the task head 222 may include information identifying various objects identified within the visual input, such as information defining boundaries of various objects in the environment depicted in the visual input. It should be recognized that the examples discussed herein are merely examples of functionality which may be performed by a machine learning model, and machine learning models used to train a model to perform a downstream task, as discussed in further detail below, may be trained to perform any variety of source tasks.

In some aspects, the encoder 210 may include a plurality of neural network blocks which may correspond to different layers within the encoder 210 or other components within a machine learning model for which weights are defined. These blocks may, in some aspects, have different or the same kernel sizes. The output of each of these neural network blocks in the encoder 210 may serve as input into one or more normalization layers and/or activation function blocks (e.g., a rectified linear unit (ReLU) block) in the decoder 220. The output of the decoder 220 may be processed through the task head 222 to perform a source task for which the machine learning model was originally trained (e.g., as discussed above and illustrated in FIG. 2, to generate a segmentation map, as the output 208, illustrating different segments, corresponding to different objects or classes of objects, in an image provided to the model 202 as the input 206).

To learn another task using transfer learning techniques, the weights and other parameters associated with the encoder 210 may be transferred to an encoder 230, and a model 204 including the encoder 230, a decoder 240, and a task head 242 may be trained to perform a downstream task different from the source task. As discussed in further detail herein, the model 204 may be trained using soft parameter sharing, in which the parameters of the model 202 (also referred to as the "source model") are used as a starting point for generating the parameters of the model 204 (also referred to as the "downstream model"). In some aspects, the encoder 230 may share a similar structure as the encoder 210, and the decoder 240 may have a similar structure as the decoder 220 or a different structure from the decoder 220. In training the encoder 230, the weights in the encoder 230 may be allowed to diverge from the weights transferred from the encoder 210 by an amount constrained by a similarity loss function, such as $\mathcal{L}_{sim}$ discussed above. That is, in updating the encoder 230 to allow a model including the encoder 230 and decoder 240 to perform a downstream task different from the source task for which a model including the encoder 210 and decoder 220 was trained, the encoder 230 may be trained by minimizing, or at least reducing, a task-specific loss and a similarity loss. As discussed, the similarity loss may be a regularizing term applied to the task-specific loss that measures the divergence of the weights for the encoder 230 from the weights for the encoder 210 such that the similarity loss is scaled to be on the same magnitude as the task-specific loss.

In some aspects, to train the encoder 230, a frozen copy of the weights from the encoder 210 may be saved in memory, and the encoder 230 may be trained based on the weights of the encoder 210 and newly learned weights from data associated with the downstream task for which a model including the encoder 230 and the decoder 240 is trained. For example, the weights learned at the encoder 230 may be used to calculate the similarity loss $\mathcal{L}_{sim}$, and the original weights transferred from the encoder 210 (e.g., the frozen copy of the weights from the encoder 210 stored in memory) and the similarity loss may be used to generate the final weights associated with the encoder 230 (e.g., to update the weights generated while training the encoder 230, according to a weight divergence constraint limiting an amount by which the weights can change relative to the weights associated with the encoder 210). In some aspects, the similarity loss may be weighted by a constant A, which may be uniquely defined for each task for which a model is trained using transfer learning techniques. The weighted similarity loss $\lambda\mathcal{L}_{sim}$ may be used as a constraint that restricts the divergence of the weights generated for the encoder 230 from the weights defined for the encoder 210.

In the example illustrated in FIG. 2, the model 204 may be trained to perform a depth estimation task on the input 206. To do so, the encoder 230, which as discussed may be trained based on soft parameter sharing and a weight divergence constraint, can encode the input 206 into a latent space representation. The latent space representation into which the input 206 is encoded may be decoded using the decoder 240, which as discussed above may have a similar or dissimilar structure from the decoder 222. The decoded latent space representation of the input 206 may be processed through the task head 242, which may be configured (e.g., trained) to perform a different task from the task head 222 of the model 202, to generate another output 209 (e.g., a depth map for the depth estimation tasks). Unlike the segmentation map provided as the output 208 discussed above, the depth map provided as the output 209 generally illustrates a relative distance of different points in the input 206 from a reference point (e.g., the location of a camera that captured the input 206).

In some aspects, by minimizing, or at least reducing, a loss function including a task-specific loss and a similarity loss, weights within the machine learning model may diverge by a smaller amount than a divergence that may result when the weights for the encoder are unconstrained. For example, the use of the weighted similarity loss $\lambda\mathcal{L}_{sim}$ may result in a weight divergence of between 1 percent and 4 percent, relative to the weights generated for the encoder 210. Meanwhile, the weight divergence for the weights of the encoder 230 generated without a weight divergence constraint may be significantly higher, such as between 15 percent and 25 percent.

As an illustrative, non-limiting example, assume that a model including the encoder 210 and the decoder 220 is trained to perform a depth estimation task, and transfer learning techniques are used to train a model including the encoder 230 and the decoder 240 to perform an object detection task. For depth estimation, a training objective may be set to minimize, or at least reduce, a scale invariant loss measuring absolute error and relationships between different points in a scene captured in a visual input. The scale invariant loss ($\mathcal{L}_{depth}$) may be represented by the equation:

$$\mathcal{L}_{depth} = \frac{1}{n}\sum_i d_i^2 - \frac{\lambda}{n^2}\left(\sum_i d_i\right)$$

where $$d_i = \log y_i - \log y_i^*, \, y_i$$

represents a predicted depth map, $$y_i^*$$

represents a ground truth depth map, and $\lambda \in [0,1]$ represents a scaling factor.

Meanwhile, the training objective for object detection may be based on a localization loss $\mathcal{L}_{loc}$ defined as the smoothed L1 loss between predicted and ground truth bounding box parameters and a confidence loss $\mathcal{L}_{conf}$ defined as the cross entropy between the predicted class confidence and the ground truth classification of an object in a training data set. The localization loss and confidence loss may be combined, with a mixing coefficient $\alpha$, such that the object detection loss ($\mathcal{L}_{detection}$) for which a model is trained is represented by the equation:

$$\mathcal{L}_{detection} = \mathcal{L}_{conf} + \alpha\mathcal{L}_{loc}$$

To generate the final weights for the encoder 230, the encoder 230 may be trained to minimize, or at least reduce, a task-specific loss, constrained by the weighted similarity loss discussed above. Thus, where the model including the encoder 210 and the decoder 220 is trained to perform an object detection task, the model may be trained to minimize, or at least reduce, $\mathcal{L}_{detection}$. Meanwhile, the model including the encoder 230 and the decoder 240 may be trained using transfer learning techniques to perform a semantic segmentation task, such that the weights associated with the encoder 230 comprise a task-specific loss (e.g., $\mathcal{L}_{depth}$), modified by a weighted similarity loss $\lambda\mathcal{L}_{sim}$.

By training a machine learning model using transfer learning techniques and weight divergence constraints, aspects of the present disclosure may provide for increased inference performance relative to machine learning models trained using transfer learning techniques without a weight divergence constraint. For example, in semantic segmentation tasks, relative to a dedicated model trained to perform semantic segmentation, a model trained using transfer learning and weight divergence constraints may exhibit minimal degradation in inference performance. In contrast, a model trained using transfer learning without a weight divergence constraint may exhibit significantly worse inference performance than the dedicated model. Similar patterns may be seen in models trained for depth estimation and object detection tasks using transfer learning techniques. In some cases, the techniques discussed herein may improve inference performance relative to a dedicated model. For example, where a model is trained to perform depth estimation tasks by transferring knowledge from a base model trained to perform semantic segmentation, inference performance on depth estimation tasks may be improved relative to a dedicated depth estimation model.

Example Operations for Transfer Learning Using Weight Divergence Constraints

FIG. 3 shows an example of operations 300 for training a machine learning model to perform a downstream task using transfer learning and weight divergence constraints, in accordance with aspects of the present disclosure. In some examples, the operations 300 may be performed by a device, such as an example processing system 400 illustrated in FIG. 4.

As illustrated, the operations 300 begin at block 310, with receiving weight information associated with a machine learning model. The machine learning model comprises a model trained to perform a first task.

At block 320, the operations 300 proceed with updating the machine learning model to perform a second task based on the received weight information and a weight divergence constraint between weights defined for the first task and weights updated for the second task.

In some aspects, updating the machine learning model may include minimizing a sum of a first loss function and a second loss function. For example, the first loss function may be a task-specific loss associated with the second task, and the second loss function may be a similarity loss between the weights defined for the first task and the weights updated for the second task.

In some aspects, the similarity loss may be a loss function that measures a normalized loss based on weights generated while updating the machine learning model to perform the second task and the received weight information.

In some aspects, the loss function may be based on a sum of a difference between the weights generated while updating the machine learning model to perform the second task and the received weight information calculated over each layer in a portion of the machine learning model. As discussed above, the similarity loss $\mathcal{L}_{sim}$ may be represented by the equation:

$$\mathcal{L}_{sim}(u, v) = \frac{\sum_i^L \|u_i - v_i\|_2}{\sum_i^L \|v_i\|_2}$$

where v represents the received weight information, u represents the updated weight information, and L represents the number of layers in the machine learning model.

In some aspects, the portion of the machine learning model may be an encoder portion of an encoder-decoder model.

In some aspects, the normalized loss may be normalized based on a sum of the received weight information.

At block 330, the operations 300 proceed with deploying the updated machine learning model.

In some aspects, the machine learning model may be an encoder-decoder model. The encoder may be trained to map an input into a latent space. The decoder may be trained to make predictions based on a latent space representation of the input.

In some aspects, the first task may be a semantic segmentation task for performing on image data. The second task may be an object detection task for performing on the image data. In some aspects, the first task may be an object detection task performed on image data. In this case, the second task may be a semantic segmentation task performed on image data.

In some aspects, the weight divergence constraint may be a product of the similarity loss and a task-specific constant. The task-specific constant may allow for weights to diverge by different amounts based on the first task for which the machine learning model is trained and the second task for which the machine learning model is to be updated using the transfer learning techniques discussed herein. Generally, larger values of the constant may allow for a larger divergence from the weights defined for the first task, which may allow transfer learning techniques to be used to update a model to perform tasks that are similar or at least somewhat different from the source task which the model was initially trained to perform. Generally, the constant may be set so that the magnitude of a task-specific loss is similar to the magnitude of the weight divergence constraint.

In some aspects, the updated machine learning model may be deployed for use in various computer vision tasks. For example, the updated machine learning model may be deployed for use in controlling an autonomous vehicle. The updated machine learning model may be used to perform various predictions which can be used to identify different types of objects in a scene captured by one or more imaging and/or ranging devices (e.g., light detection and ranging (LIDAR) sensors, ultrasonic sensors, radar, etc.), determine the position of various objects in a scene (e.g., relative to a path of travel of the autonomous vehicle), and the like. These predictions can then be used to generate control signals that control the operations of the autonomous vehicle. For example, where an object is determined to be within the path of the autonomous vehicle, the predictions generated by the machine learning model may be used to generate control signals that can adjust the path of travel for the autonomous vehicle, adjust the velocity at which the autonomous vehicle is traveling, stop the autonomous vehicle (e.g., by applying brakes of the autonomous vehicle), or the like.

In another example, the updated machine learning model may be deployed for use in controlling a robotic arm in a constrained environment. The updated machine learning model may be used to perform various predictions, such as whether the arm will collide with a boundary or another object within the constrained environment, predict how and at what location to grasp or otherwise interact with an object in the constrained environment, or the like. These predictions can, as with the autonomous vehicle scenario discussed above, be used to control the motion of the robotic arm such that the robotic arm performs a desired task while avoiding collisions with other objects within the constrained environment.

It should be recognized that the foregoing are merely examples of environments in which the updated machine learning models discussed above may be deployed, and the deployment of an updated model trained using transfer learning techniques and weight divergence constraints in other environments and/or for other combinations of tasks may be contemplated.

Figure 4:
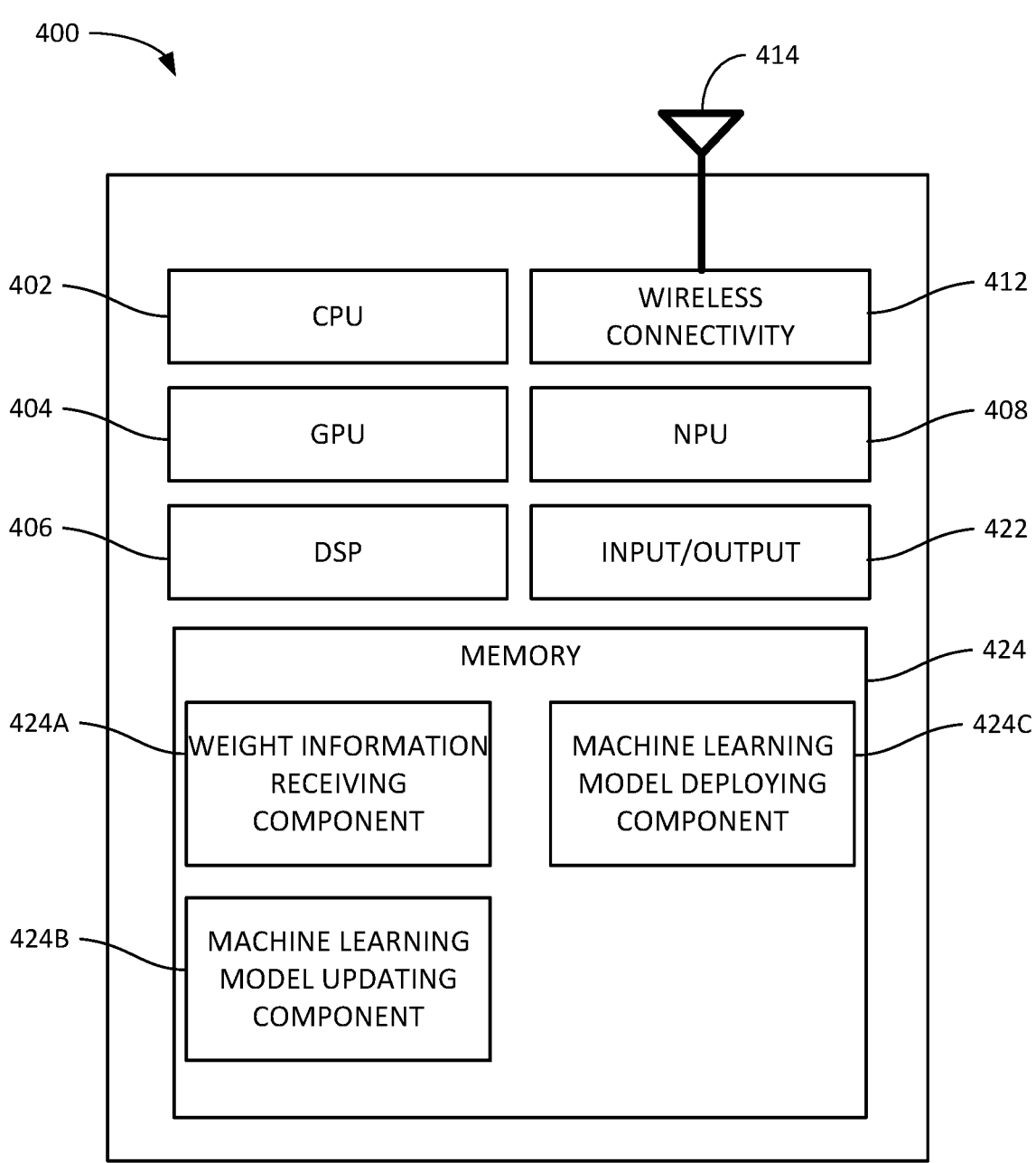
FIG. 4 illustrates an example system on which aspects of the present disclosure may be executed, in accordance with aspects of the present disclosure.

Example Processing Systems for Transfer Learning Using Weight Divergence Constraints FIG. 4 depicts an example processing system 400 for training a machine learning model to perform a downstream task different from a source task using transfer learning and weight divergence constraints, such as described herein for example with respect to FIG. 3.

The processing system 400 includes a central processing unit (CPU) 402, which in some examples may be a multi-core CPU. Instructions executed at the CPU 402 may be loaded, for example, from a program memory associated with the CPU 402 or may be loaded from a memory 424.

The processing system 400 also includes additional processing components tailored to specific functions, such as a graphics processing unit (GPU) 404, a digital signal processor (DSP) 406, a neural processing unit (NPU) 408, a multimedia processing unit 410, and a wireless connectivity component 412.

An NPU, such as NPU 408, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 408, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the plurality of NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In some implementations, the NPU 408 is a part of one or more of the CPU 402, the GPU 404, and/or the DSP 406.

In some examples, the wireless connectivity component 412 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and other wireless data transmission standards. The wireless connectivity component 412 is further coupled to one or more antennas 414.

The processing system 400 may also include one or more input and/or output devices 422, such as screens, touch-sensitive surfaces (including touch-sensitive displays), physical buttons, speakers, microphones, and the like.

In some examples, one or more of the processors of the processing system 400 may be based on an ARM or RISC-V instruction set.

The processing system 400 also includes the memory 424, which is representative of one or more static and/or dynamic memories, such as a dynamic random access memory, a flash-based static memory, and the like. In this example, the memory 424 includes computer-executable components, which may be executed by one or more of the aforementioned processors of the processing system 400.

In particular, in this example, the memory 424 includes a weight information receiving component 424A, a machine learning model updating component 424B, and a machine learning model deploying component 424C. The depicted components, and others not depicted, may be configured to perform various aspects of the methods described herein.

Generally, the processing system 400 and/or components thereof may be configured to perform the methods described herein.

Notably, in other aspects, elements of the processing system 400 may be omitted, such as where the processing system 400 is a server computer or the like. Further, elements of the processing system 400 may be distributed, such as training a model and using the model to generate inferences, such as user verification predictions.

Example Clauses

Implementation details of various aspects of the present disclosure are described in the following numbered clauses.

Clause 1: A processor-implemented method, comprising: receiving weight information associated with a machine learning model, wherein the machine learning model comprises a model trained to perform a first task; updating the machine learning model to perform a second task based on the received weight information and a weight divergence constraint between weights defined for the first task and weights updated for the second task; and deploying the updated machine learning model.

Clause 2: The method of Clause 1, wherein the machine learning model comprises an encoder-decoder model including an encoder trained to map an input into a latent space and a decoder trained to make predictions based on a latent space representation of the input.

Clause 3: The method of Clause 1 or 2, wherein updating the machine learning model comprises minimizing a sum of a first loss function and a second loss function, wherein the first loss function comprises a task-specific loss for the second task, and wherein the second loss function comprises a similarity loss between the weights defined for the first task and the weights updated for the second task.

Clause 4: The method of Clause 3, wherein the similarity loss comprises a loss function measuring a normalized loss based on the weights updated for the second task and the received weight information.

Clause 5: The method of Clause 4, wherein the loss function is based on a sum of a difference between the weights updated for the second task and the received weight information calculated over each layer in a portion of the machine learning model.

Clause 6: The method of Clause 5, wherein the portion of the machine learning model comprises an encoder portion of an encoder-decoder model.

Clause 7: The method of any of Clauses 4 through 6, wherein the normalized loss is normalized based on a sum of the received weight information.

Clause 8: The method of any of Clauses 1 through 7, wherein: the first task comprises a semantic segmentation task for performing on image data, and the second task comprises an object detection task for performing on the image data.

Clause 9: The method of any of Clauses 1 through 7, wherein: the first task comprises an object detection task for performing on image data, and the second task comprises a semantic segmentation task for performing on the image data.

Clause 10: The processing system of any of Clauses 1 through 9, wherein the weight divergence constraint comprises a product of a similarity loss and a task-specific constant.

Clause 11: A processing system comprising: a memory comprising computer-executable instructions; and one or more processors configured to execute the computer-executable instructions and cause the processing system to perform a method in accordance with any of Clauses 1 through 10.

Clause 12: A processing system comprising means for performing a method in accordance with any of Clauses 1 through 10.

Clause 13: A non-transitory computer-readable medium comprising computer-executable instructions that, when executed by one or more processors of a processing system, cause the processing system to perform a method in accordance with any of Clauses 1 through 10.

Clause 14: A computer program product embodied on a computer-readable storage medium comprising code for performing a method in accordance with any of Clauses 1 through 10.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system, comprising:

at least one memory having executable instructions stored thereon; and one or more processors configured to execute the executable instructions in order to cause the processing system to:

receive weight information associated with a machine learning model, wherein the machine learning model comprises a model trained to perform a first task;

update the machine learning model to perform a second task based on the received weight information and a weight divergence constraint between weights defined for the first task and weights updated for the second task; and deploy the updated machine learning model;

wherein to update the machine learning model, the one or more processors are configured to cause the processing system to minimize a sum of a first loss function and a second loss function, wherein the first loss function comprises a task-specific loss for the second task, and wherein the second loss function comprises a similarity loss between the weights defined for the first task and the weights updated for the second task;

wherein the similarity loss comprises a loss function measuring a normalized loss based on the weights updated for the second task and the received weight information; and wherein the loss function is based on a sum of a difference between the weights updated for the second task and the received weight information calculated over each layer in a portion of the machine learning model.

2. The processing system of claim 1, wherein the machine learning model comprises an encoder-decoder model including an encoder trained to map an input into a latent space and a decoder trained to make predictions based on a latent space representation of the input.

3. The processing system of claim 1, wherein the portion of the machine learning model comprises an encoder portion of an encoder-decoder model.

4. The processing system of claim 1, wherein the normalized loss is normalized based on a sum of the received weight information.

5. The processing system of claim 1, wherein:

the first task comprises a semantic segmentation task for performing on image data, and the second task comprises an object detection task for performing on the image data.

6. The processing system of claim 1, wherein:

the first task comprises an object detection task for performing on image data, and the second task comprises a semantic segmentation task for performing on the image data.

7. The processing system of claim 1, wherein the weight divergence constraint comprises a product of a similarity loss and a task-specific constant.

8. A processor-implemented method, comprising:

receiving weight information associated with a machine learning model, wherein the machine learning model comprises a model trained to perform a first task;

updating the machine learning model to perform a second task based on the received weight information and a weight divergence constraint between weights defined for the first task and weights updated for the second task; and deploying the updated machine learning model;

wherein updating the machine learning model comprises minimizing a sum of a first loss function and a second loss function, wherein the first loss function comprises a task-specific loss for the second task, and wherein the second loss function comprises a similarity loss between the weights defined for the first task and the weights updated for the second task;

wherein the similarity loss comprises a loss function measuring a normalized loss based on the weights updated for the second task and the received weight information; and wherein the loss function is based on a sum of a difference between the weights updated for the second task and the received weight information calculated over each layer in a portion of the machine learning model.

9. The method of claim 8, wherein the machine learning model comprises an encoder-decoder model including an encoder trained to map an input into a latent space and a decoder trained to make predictions based on a latent space representation of the input.

10. The method of claim 8, wherein the portion of the machine learning model comprises an encoder portion of an encoder-decoder model.

11. The method of claim 8, wherein the normalized loss is normalized based on a sum of the received weight information.

12. The method of claim 8, wherein:

the first task comprises a semantic segmentation task for performing on image data, and the second task comprises an object detection task for performing on the image data.

13. The method of claim 8, wherein:

the first task comprises an object detection task for performing on image data, and the second task comprises a semantic segmentation task for performing on the image data.

14. The method of claim 8, wherein the weight divergence constraint comprises a product of a similarity loss and a task-specific constant.

15. A processing system, comprising:

means for receiving weight information associated with a machine learning model, wherein the machine learning model comprises a model trained to perform a first task;

means for updating the machine learning model to perform a second task based on the received weight information and a weight divergence constraint between weights defined for the first task and weights updated for the second task; and means for deploying the updated machine learning model;

wherein the means for updating the machine learning model comprises minimizing a sum of a first loss function and a second loss function, wherein the first loss function comprises a task-specific loss for the second task, and wherein the second loss function comprises a similarity loss between the weights defined for the first task and the weights updated for the second task;

wherein the similarity loss comprises a loss function measuring a normalized loss based on the weights updated for the second task and the received weight information; and wherein the loss function is based on a sum of a difference between the weights updated for the second task and the received weight information calculated over each layer in a portion of the machine learning model.

16. The processing system of claim 15, wherein the machine learning model comprises an encoder-decoder model including an encoder trained to map an input into a latent space and a decoder trained to make predictions based on a latent space representation of the input.

17. The processing system of claim 15, wherein the portion of the machine learning model comprises an encoder portion of an encoder-decoder model.

18. The processing system of claim 15, wherein the normalized loss is normalized based on a sum of the received weight information.

19. The processing system of claim 15, wherein:

the first task comprises a semantic segmentation task for performing on image data, and the second task comprises an object detection task for performing on the image data.

20. The processing system of claim 15, wherein the weight divergence constraint comprises a product of a similarity loss and a task-specific constant.

21. A non-transitory computer-readable medium having executable instructions stored thereon which, when executed by one or more processors, perform an operation comprising:

receiving weight information associated with a machine learning model, wherein the machine learning model comprises a model trained to perform a first task;

updating the machine learning model to perform a second task based on the received weight information and a weight divergence constraint between weights defined for the first task and weights updated for the second task; and deploying the updated machine learning model;

wherein to update the machine learning model, the one or more processors are configured to cause the processing system to minimize a sum of a first loss function and a second loss function, wherein the first loss function comprises a task-specific loss for the second task, and wherein the second loss function comprises a similarity loss between the weights defined for the first task and the weights updated for the second task;

wherein the similarity loss comprises a loss function measuring a normalized loss based on the weights updated for the second task and the received weight information; and wherein the loss function is based on a sum of a difference between the weights updated for the second task and the received weight information calculated over each layer in a portion of the machine learning model.

$$* \quad * \quad * \quad * \quad *$$